United States Patent
Zhang et al.

(10) Patent No.: US 11,398,075 B2
(45) Date of Patent: Jul. 26, 2022

(54) METHODS AND SYSTEMS FOR PROCESSING AND COLORIZING POINT CLOUDS AND MESHES

(71) Applicant: Kaarta, Inc., Pittsburgh, PA (US)

(72) Inventors: Ji Zhang, Pittsburgh, PA (US); Ethan Abramson, Pittsburgh, PA (US); Brian Boyle, Pittsburgh, PA (US); Steven Huber, Pittsburgh, PA (US)

(73) Assignee: Kaarta, Inc., Pittsburgh, PA (US)

( * ) Notice: Subject to any disclaimer, the term of this patent is extended or adjusted under 35 U.S.C. 154(b) by 0 days.

(21) Appl. No.: 16/929,154

(22) Filed: Jul. 15, 2020

(65) Prior Publication Data
US 2020/0349761 A1 Nov. 5, 2020

Related U.S. Application Data

(63) Continuation of application No. PCT/US2019/019132, filed on Feb. 22, 2019.

(60) Provisional application No. 62/634,473, filed on Feb. 23, 2018.

(51) Int. Cl.
| | |
|---|---|
| *G06T 17/20* | (2006.01) |
| *G06T 7/00* | (2017.01) |
| *G06T 7/90* | (2017.01) |
| *G06T 15/00* | (2011.01) |
| *G06T 15/10* | (2011.01) |

(52) U.S. Cl.
CPC ............... *G06T 17/20* (2013.01); *G06T 7/90* (2017.01); *G06T 7/97* (2017.01); *G06T 15/005* (2013.01); *G06T 15/10* (2013.01); *G06T 2207/10028* (2013.01); *G06T 2207/10052* (2013.01)

(58) Field of Classification Search
None
See application file for complete search history.

(56) References Cited

U.S. PATENT DOCUMENTS

| | | | |
|---|---|---|---|
| 5,988,862 | A | 11/1999 | Kacyra et al. |
| 6,009,188 | A | 12/1999 | Cohen et al. |
| 6,111,582 | A | 8/2000 | Jenkins |
| D432,930 | S | 10/2000 | Sanoner |
| 6,208,347 | B1 | 3/2001 | Migdal et al. |

(Continued)

FOREIGN PATENT DOCUMENTS

| | | |
|---|---|---|
| CN | 102508258 A | 6/2012 |
| CN | 102819863 A | 12/2012 |

(Continued)

OTHER PUBLICATIONS

17860192.8, "European Application Serial No. 17860192.8, Extended European Search Report dated Apr. 24, 2020", Kaarta, Inc., 12 pages.

(Continued)

*Primary Examiner* — Frank S Chen
(74) *Attorney, Agent, or Firm* — GTC Law Group PC & Affiliates (57) ABSTRACT

A method includes determining a mesh representing an environment based, at least in part, on a point cloud the mesh comprising a plurality of triangles each having a normal vector, acquiring one or more images of the environment wherein each of the one or more images is attributed with a view position and a view angle and applying the one or more images to the mesh.

27 Claims, 4 Drawing Sheets

(56) References Cited

U.S. PATENT DOCUMENTS

| | | |
|---|---|---|
| 6,771,840 B1 | 8/2004 | Ioannou et al. |
| 7,752,483 B1 | 7/2010 | Muresan et al. |
| 8,406,994 B1 | 3/2013 | Pu et al. |
| 8,676,498 B2 | 3/2014 | Ma et al. |
| 8,996,228 B1 | 3/2015 | Ferguson et al. |
| 9,031,809 B1 | 5/2015 | Kumar et al. |
| 9,043,069 B1 | 5/2015 | Burnette et al. |
| 9,143,413 B1 | 9/2015 | Manku et al. |
| 9,315,192 B1 | 4/2016 | Zhu et al. |
| D823,920 S | 7/2018 | Wiegmann |
| 10,962,370 B2 | 3/2021 | Zhang et al. |
| 10,989,542 B2 | 4/2021 | Zhang et al. |
| 2003/0001835 A1 | 1/2003 | Dimsdale et al. |
| 2003/0160785 A1 | 8/2003 | Baumberg |
| 2005/0168437 A1 | 8/2005 | Carl et al. |
| 2005/0203930 A1 | 9/2005 | Bukowski et al. |
| 2005/0286757 A1 | 12/2005 | Zitnick et al. |
| 2007/0097120 A1 | 5/2007 | Wheeler et al. |
| 2007/0262988 A1 | 11/2007 | Christensen et al. |
| 2007/0291233 A1 | 12/2007 | Culbertson et al. |
| 2008/0033645 A1 | 2/2008 | Levinson et al. |
| 2008/0112610 A1* | 5/2008 | Israelsen ............ G06T 17/00 |
| | | 382/154 |
| 2009/0043439 A1 | 2/2009 | Barfoot et al. |
| 2009/0237297 A1 | 9/2009 | Davis et al. |
| 2009/0262974 A1 | 10/2009 | Lithopoulos et al. |
| 2010/0090899 A1 | 4/2010 | Zhao et al. |
| 2010/0111370 A1 | 5/2010 | Black et al. |
| 2010/0286905 A1 | 11/2010 | Goncalves et al. |
| 2011/0134225 A1 | 6/2011 | Saint-Pierre et al. |
| 2011/0178708 A1 | 7/2011 | Zhang et al. |
| 2011/0282622 A1 | 11/2011 | Canter |
| 2011/0300929 A1 | 12/2011 | Tardif et al. |
| 2011/0301786 A1 | 12/2011 | Allis et al. |
| 2012/0123615 A1 | 5/2012 | Bourzier |
| 2013/0085378 A1 | 4/2013 | Wedan et al. |
| 2013/0135305 A1 | 5/2013 | Bystrov et al. |
| 2013/0176305 A1 | 7/2013 | Ito et al. |
| 2013/0181983 A1 | 7/2013 | Kitamura et al. |
| 2013/0321418 A1 | 12/2013 | Kirk |
| 2013/0325244 A1 | 12/2013 | Wang et al. |
| 2014/0043436 A1 | 2/2014 | Bell et al. |
| 2014/0125768 A1 | 5/2014 | Bell et al. |
| 2014/0180579 A1 | 6/2014 | Friend et al. |
| 2014/0180914 A1 | 6/2014 | Abhyanker |
| 2014/0193040 A1 | 7/2014 | Bronshtein |
| 2014/0214255 A1 | 7/2014 | Dolgov et al. |
| 2014/0278570 A1 | 9/2014 | Plummer et al. |
| 2014/0297092 A1 | 10/2014 | Delp |
| 2014/0300885 A1 | 10/2014 | Debrunner et al. |
| 2014/0300886 A1 | 10/2014 | Zogg et al. |
| 2014/0301633 A1 | 10/2014 | Furukawa et al. |
| 2014/0316698 A1 | 10/2014 | Roumeliotis et al. |
| 2014/0333741 A1 | 11/2014 | Nerurkar et al. |
| 2014/0350836 A1 | 11/2014 | Stettner et al. |
| 2014/0379256 A1 | 12/2014 | Stipes et al. |
| 2015/0015602 A1* | 1/2015 | Beaudoin ............ G06T 7/001 |
| | | 345/619 |
| 2015/0063683 A1 | 3/2015 | Fu |
| 2015/0063707 A1 | 3/2015 | Fu |
| 2015/0142378 A1 | 5/2015 | Hebert et al. |
| 2015/0317832 A1 | 11/2015 | Ebstyne et al. |
| 2015/0331111 A1 | 11/2015 | Newman et al. |
| 2015/0350378 A1* | 12/2015 | Hertel ............ G06F 16/583 |
| | | 709/203 |
| 2016/0070265 A1 | 3/2016 | Liu et al. |
| 2016/0086336 A1* | 3/2016 | Lin ............ H04N 13/282 |
| | | 348/50 |
| 2016/0125226 A1 | 5/2016 | Huang |
| 2016/0140757 A1 | 5/2016 | Voth |
| 2016/0189348 A1 | 6/2016 | Canter |
| 2016/0234476 A1 | 8/2016 | Millett |
| 2016/0274589 A1 | 9/2016 | Templeton et al. |
| 2016/0349746 A1 | 12/2016 | Grau |
| 2016/0379366 A1 | 12/2016 | Shah et al. |
| 2017/0116781 A1 | 4/2017 | Babahajiani et al. |
| 2017/0122736 A1 | 5/2017 | Dold et al. |
| 2017/0123066 A1 | 5/2017 | Coddington et al. |
| 2017/0186221 A1* | 6/2017 | Khorasani ............ G06T 17/20 |
| 2017/0191826 A1 | 7/2017 | Nagori et al. |
| 2017/0208251 A1 | 7/2017 | Shamir et al. |
| 2018/0075648 A1 | 3/2018 | Moghadam et al. |
| 2018/0342080 A1* | 11/2018 | Maddern ............ G06T 5/40 |
| 2019/0003836 A1 | 1/2019 | Zhang et al. |
| 2019/0052844 A1* | 2/2019 | Droz ............ H04N 7/183 |
| 2019/0235083 A1 | 8/2019 | Zhang et al. |
| 2019/0346271 A1 | 11/2019 | Zhang et al. |
| 2020/0142074 A1 | 5/2020 | Huber et al. |
| 2020/0217666 A1 | 7/2020 | Zhang et al. |
| 2020/0233085 A1 | 7/2020 | Zhang et al. |
| 2020/0400442 A1 | 12/2020 | Huber et al. |
| 2021/0025998 A1 | 1/2021 | Huber |
| 2021/0027477 A1 | 1/2021 | Huber |
| 2021/0293544 A1 | 9/2021 | Zhang et al. |
| 2021/0293546 A1 | 9/2021 | Zhang et al. |

FOREIGN PATENT DOCUMENTS

| | | |
|---|---|---|
| CN | 104913763 A | 9/2015 |
| CN | 105164494 A | 12/2015 |
| DE | 102014019671 A1 | 6/2016 |
| EP | 2133662 B1 | 2/2012 |
| EP | 3109589 A1 | 12/2016 |
| EP | 3427008 A1 | 1/2019 |
| EP | 3526626 A1 | 8/2019 |
| EP | 3574285 A1 | 12/2019 |
| EP | 3646058 A1 | 5/2020 |
| EP | 3656138 A1 | 5/2020 |
| JP | H09142236 A | 6/1997 |
| JP | 2004348575 A | 12/2004 |
| JP | 2006276012 A | 10/2006 |
| JP | 2007298332 A | 11/2007 |
| JP | 2010175423 A | 8/2010 |
| JP | 2010533307 A | 10/2010 |
| JP | 2011529569 A | 12/2011 |
| JP | 3173419 U | 1/2012 |
| JP | 2012063173 A | 3/2012 |
| JP | 2012507011 A | 3/2012 |
| JP | 2013054660 A | 3/2013 |
| JP | 2013093738 A | 5/2013 |
| JP | 2013517483 A | 5/2013 |
| JP | 2015200615 A | 11/2015 |
| JP | 2015210186 A | 11/2015 |
| JP | 2016080572 A | 5/2016 |
| JP | 2019518222 A | 6/2019 |
| JP | 2019532433 A | 11/2019 |
| JP | 2020507072 A | 3/2020 |
| JP | 6987797 B2 | 12/2021 |
| WO | 2010004911 A1 | 1/2010 |
| WO | 2014048475 A1 | 4/2014 |
| WO | 2014120613 A1 | 8/2014 |
| WO | 2014130854 A1 | 8/2014 |
| WO | 2015105597 A2 | 7/2015 |
| WO | 2017009923 A1 | 1/2017 |
| WO | 2017155970 A1 | 9/2017 |
| WO | 2018071416 A1 | 4/2018 |
| WO | 2018140701 A1 | 8/2018 |
| WO | 2019006289 A1 | 1/2019 |
| WO | 2019018315 A1 | 1/2019 |
| WO | 2019099605 A1 | 5/2019 |
| WO | 2019165194 A1 | 8/2019 |
| WO | 2019178429 A1 | 9/2019 |
| WO | 2019195270 A1 | 10/2019 |
| WO | 2020009826 A1 | 1/2020 |

OTHER PUBLICATIONS 18745179.4, "European Application Serial No. 18745179.4, Extended European Search Report dated Nov. 2, 2020", Kaarta, Inc., 10 pages.

18824609.4, "European Application Serial No. 18824609.4, Extended European Search Report dated Nov. 2, 2020", Kaarta, Inc., 12 pages.

(56) References Cited

OTHER PUBLICATIONS

Adler, Benjamin, et al., "Towards Autonomous Airborne Mapping of Urban Environments", Multisensor Fusion and Integration for Intelligent Systems (MFI), 2012 IEEE Conference, 2012, pp. 77-82.
Chen, Chao-I, et al., "Drogue tracking using 3D flash lidar for autonomous aerial refueling", Laser Radar Technology and Applications XVI, 2011, pp. 1-11.
PCT/US19/22384, "International Application Serial No. PCT/US19/22384, International Preliminary Report on Patentability dated Sep. 24, 2020", Kaarta, Inc., 11 pages.
PCT/US2019/019132, "International Application Serial No. PCT/US2019/019132, International Preliminary Report on Patentability dated Sep. 3, 2020", Kaarta, Inc., 13 pages.
PCT/US2019/025360, "International Application Serial No. PCT/US2019/025360, International Preliminary Report on Patentability dated Oct. 15, 2020", Kaarta, Inc., 6 pages.
PCT/US2019/038688, "International Application Serial No. PCT/US2019/038688, International Preliminary Report on Patentability dated Jan. 14, 2021", Kaarta, Inc., 11 pages.
Wiemann, Thomas, et al., "Automatic Construction of Polygonal Maps From Point Cloud Data", Safety Security and Rescue Robotics (SSRR), 2010 IEEE International Workshop, 2010, pp. 1-6.
"Measurement accuracy of Lidarbased SLAM systems", Sep. 2016, 1-15.
"Safety Efficiency Performance for Near Earth Flight", www.nearearth.aero, 2015, pp. 1-2.
17763885.5, "European Application Serial No. 17763885.5, Extended European Search Report dated Sep. 17, 2019", Kaarta, Inc., 7 pages.
Belfiore, "This Mobile Device Can Map Your Future Home", https://www.bloomberg.com/news/articles/2017-03-09/this-mobile-device-can-map-your-future-home, Mar. 9, 2017, 1-10.
Besl, et al., "A Method for Registration of 3-D Shapes", IEEE Transactions on Pattern Analysis and Machine Intelligence, vol. 14, No. 2, Feb. 1992, pp. 239-256.
Chen, et al., "Object modelling by registration of multiple range images", Image and Vision Computing, vol. 10, iss. 3, Apr. 1992, pp. 145-155.
Lopez, "Combining Object Recognition and Metric Mapping for Spatial Modeling with Mobile Robots", Master's Thesis in Computer Science at the School of Computer Science and Engineering, 2007, pp. 21-23, 44-56.
PCT/US18/40269, "International Application Serial No. PCT/US18/40269, International Preliminary Report on Patentability dated Jan. 9, 2020", Kaarta, Inc., 12 pages.
PCT/US18/40269, "International Application Serial No. PCT/US18/40269, International Search Report and Written Opinion dated Oct. 19, 2018", Kaarta, Inc., 19 Pages.
PCT/US18/40269, "International Application Serial No. PCT/US18/40269, Invitation to Pay Additional Fees and, Where Applicable, Protest Fee dated Aug. 9, 2018", Kaarta, Inc., 2 Pages.
PCT/US18/42346, "International Application Serial No. PCT/US18/42346, International Preliminary Report on Patentability dated Jan. 21, 2020", Kaarta, Inc., 11 pages.
PCT/US18/42346, "International Application Serial No. PCT/US18/42346, International Search Report and Written Opinion dated Oct. 1, 2018", Kaarta, Inc., 13 Pages.
PCT/US18/61186, "International Application Serial No. PCT/US18/61186, International Preliminary Report on Patentability dated May 28, 2020", Kaarta, Inc., 9 pages.
PCT/US18/61186, "International Application Serial No. PCT/US18/61186, International Search Report and Written Opinion dated Mar. 18, 2019", Kaarta, Inc., 11 pages.
PCT/US18/61186, "International Application Serial No. PCT/US18/61186, Invitation to Pay Additional Fees and, Where Applicable, Protest Fee dated Jan. 16, 2019", Kaarta, Inc., 2 pages.
PCT/US19/22384, "International Application Serial No. PCT/US19/22384, International Search Report and Written Opinion dated Aug. 7, 2019", Kaarta, Inc., 14 pages.
PCT/US2017/021120, "Application Serial No. PCT/US2017/021120, International Search Report and the Written Opinion dated May 31, 2017", 8 pages.
PCT/US2017/021120, "International Application Serial No. PCT/US2017/021120, International Preliminary Report on Patentability and Written Opinion dated Sep. 20, 2018", Kaarta, Inc., 7 Pages.
PCT/US2017/055938, "Application Serial No. PCTUS2017055938, Invitation to Pay Additional Fees dated Nov. 14, 2017", 2 Pages.
PCT/US2017/055938, "International Application Serial No. PCT/US2017/055938, International Preliminary Report on Patentability dated Apr. 25, 2019", Kaarta, Inc., 14.
PCT/US2017/055938, "International Application Serial No. PCT/US2017/055938, International Search Report and Written Opinion dated Feb. 7, 2018", Kaarta, Inc., 17 pages.
PCT/US2018/015403, "International Application Serial No. PCT/US2018/015403, International Preliminary Report on Patentability dated Aug. 8, 2019", Kaarta, Inc., 5 pages.
PCT/US2018/015403, "International Application Serial No. PCT/US2018/015403, International Search Report and Written Opinion dated Mar. 22, 2018", Kaarta, Inc., 12 Pages.
PCT/US2019/019132, "International Application Serial No. PCT/US2019/019132, International Search Report and Written Opinion dated May 14, 2019", Kaarta, Inc., 15 pages.
PCT/US2019/022384, "International Application Serial No. PCT/US2019/022384,Invitation to Pay Additional Fees dated May 20, 2019", Kaarta, Inc., 2 pages.
PCT/US2019/025360, "International Application Serial No. PCT/US2019/025360, International Search Report and Written Opinion dated Jun. 21, 2019", Kaarta, Inc., 7 pages.
PCT/US2019/038688, "International Application Serial No. PCT/US2019/038688, International Search Report and Written Opinion dated Sep. 12, 2019", Kaarta, Inc., 12 pages.
Zhang, et al., "Laser-visual-inertial odometry and mapping with high robustness and low drift", wileyonlinelibrary.com/journal/rob, Nov. 10, 2017, pp. 1242-1264.
Zhang, et al., "Laser-visual-inertial Odometry Enabling Aggressive Motion Estimation and Mapping at High Robustness and Low Drift", sagepub.co.uk/journalsPermissions.nav DOI: 10.1177/ToBeAssigned www.sagepub.com/, Nov. 2017, pp. 1-18.
Zhang, et al., "LOAM: Lidar Odometry and Mapping in Real-time", Robotics: Science and Systems Conference, Jul. 2014, 9 pages.
Zhang, "Online Lidar and Vision based Ego-motion Estimation and Mapping", Feb. 2017, 1-130.
Zhang, "Online Mapping with a Real Earth Contour II", https://www.youtube.com/watch?v=CfsM4-x6feU, Nov. 24, 2015.
Zhang, et al., "Real-time Depth Enhanced Monocular Odometry", 2014 IEEE/RSJ International Conference on Intelligent Robots and Systems (IROS 2014), Chicago, IL, USA., Sep. 14-18, 2014, pp. 4973-4980.
Zhang, et al., "Visual-Lidar Odometry and Mapping: Low-drift, Robust, and Fast", 2015 IEEE International Conference on Robotics and Automation (ICRA), Washington State Convention Center, Seattle, Washington., May 26-30, 2015, pp. 2174-2181.
Zheng, et al., "Non-local Scan Consolidation for 3D Urban Scenes", ACM SIGGRAPH 2010. Retrieved on Jan. 20, 2018., 2010, 9 Pages.
U.S. Appl. No. 17/188,567, filed Mar. 1, 2021, Pending.
U.S. Appl. No. 17/202,602, filed Mar. 16, 2021, Pending.
18834521.9, "European Application Serial No. 18834521.9, Extended European Search Report dated Apr. 12, 2021", Kaarta, Inc., 9 pages.
Ishii, Masahiro, "A system for acquiring three-dimensional shapes represented by gestures", "Input-Output", Image Labo., vol. 23, No. 3, Image Laboratory, Japan, Japan Industrial Publishing Co., Ltd., vol. 23, 2012, pp. 14-18.
Kim, Bong Keun, "Indoor localization and point cloud generation for bulling interior modeling", IEEE RO-MAN, 2013, pp. 186-191.
Mirowski, Piotr, et al., "Depth Camera Slam on a Low-cost WiFi Mapping Robot", Technologies for Practial Rebot Applications (TEPRA), 2012 IEEE International Conference ON, IEEE, Apr. 23, 2012, pp. 1-6.

\* cited by examiner

METHODS AND SYSTEMS FOR PROCESSING AND COLORIZING POINT CLOUDS AND MESHES

STATEMENT OF PRIORITY

This application claims priority to, and is a bypass continuation of, PCT Application No. PCT/US19/19132 entitled "METHODS AND SYSTEMS FOR PROCESSING AND COLORIZING POINT CLOUDS AND MESHES", filed Feb. 22, 2019.

PCT Application No. PCT/US19/19132 claims priority to U.S. Provisional Patent Application Ser. No. 62/634,473, entitled "METHODS AND SYSTEMS FOR PROCESSING AND COLORIZING POINT CLOUDS AND MESHES," filed on Feb. 23, 2018.

The disclosure of PCT/US18/42346 (Publication No. WO 2019/018315), entitled "ALIGNING MEASURED SIGNAL DATA WITH SLAM LOCALIZATION DATA AND USES THEREOF," filed on Jul. 16, 2018, is incorporated herein by reference in its entirety and for all purposes.

BACKGROUND

Field

The methods and systems described herein generally relate to the production of colorized meshes derived from a combination of LIDAR acquired point clouds and one or more images. More particularly, the methods described herein are directed to the acquisition of point and image data by a simultaneous location and mapping (SLAM) system and the real-time or near real-time processing of such data to produce colorized meshes.

Description of the Related Art

There are many applications where an accurate model of a local area is required and common ways of producing these localized models include, but are not limited to, using cameras and LIDAR. These sensors can capture local information within their Field of View (FOV) and, through observations of the relationships between complex geometry, a system incorporating the sensors may register point clouds of their environment which may in turn be colorized.

Rather than a representation of an environment comprised solely of point cloud data, even colorized points with RGB values, it is often advantageous to process the point cloud to produce a mesh representing real world surfaces. It is further desirable for the produced mesh to be colored using imagery acquired concurrently with the underlying point cloud data as well as data defining the trajectory and orientation of the camera utilized to capture the images.

In the description that follows, there are described exemplary and non-limiting embodiments of methods for producing colorized meshes from LIDAR derived point clouds and imagery such as may form a part of a SLAM system.

SUMMARY

The examples in this section are merely representative of some possible embodiments, but do not reflect all possible embodiments, combination of elements, or inventions disclosed in this application. In an example, a method may include determining a mesh representing an environment based, at least in part, on a point cloud the mesh comprising a plurality of triangles each having a normal vector, acquiring one or more images of the environment wherein each of the one or more images is attributed with a view position and a view angle and applying the one or more images to the mesh.

In accordance with another exemplary and non-limiting embodiment, a system may include a camera unit, a laser scanning unit and a computing system in communication with the camera unit and the laser scanning unit, wherein the computing system comprises at least one processor adapted to software that when executed causes the system to determine a mesh representing an environment based, at least in part, on a point cloud the mesh comprising a plurality of triangles each having a normal vector, acquire one or more images of the environment wherein each of the one or more images is attributed with a view position and a view angle and apply the one or more images to the mesh.

DETAILED DESCRIPTION

Figure 1:
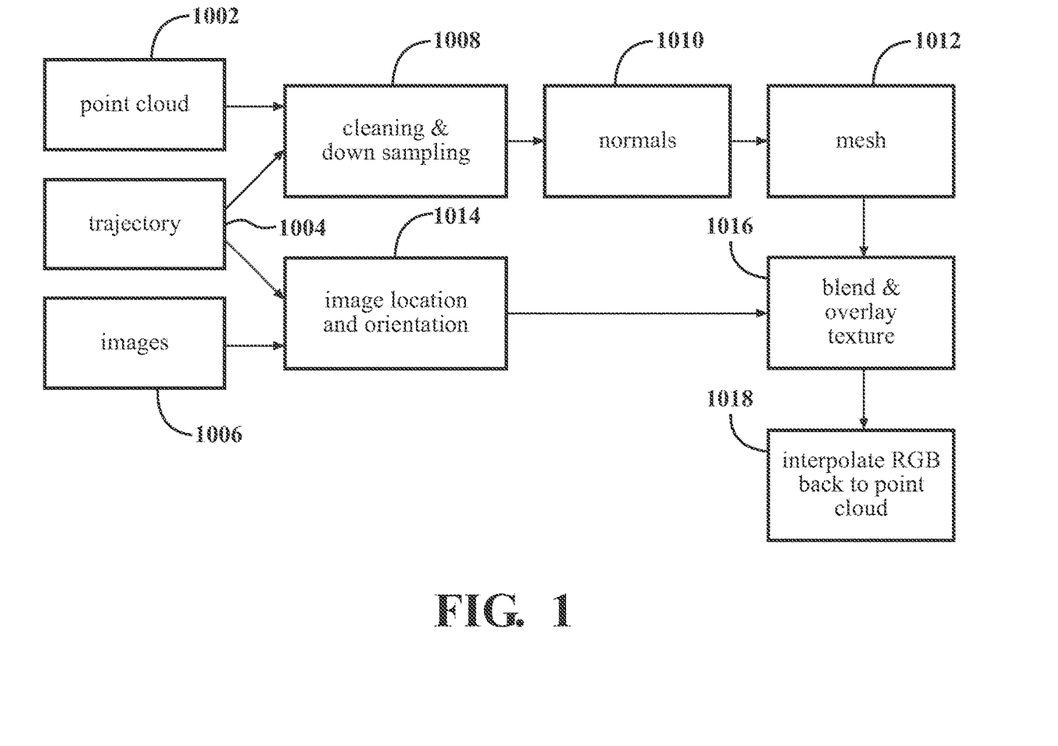
FIG. 1 illustrates a flow chart of an exemplary and non-limiting embodiment method for the colorizing of point cloud derived meshes.

With reference to FIG. 1, there is illustrated an exemplary and non-limiting embodiment of a point cloud colorization method utilizing a simultaneous location and mapping (SLAM) system. In general, the method operates to convert a point cloud comprising a plurality of discreet points in a three dimensional space defining an environment into a set of surfaces comprised of a plurality of polygons. In accordance with the exemplary and non-limiting embodiments discussed herein these polygons form triangles. In some embodiments, the surface is colorized based, at least in part, on acquired imagery of the environment.

It is known to colorize individual points in point clouds. For example, individual points forming a point cloud may be assigned a color representing a derived property of the point. For example, points may be colored to indicate the density of points in three dimensional space surrounding each point. Points may be colored to indicate a confidence level in each point's location. As discussed more fully below, data visualization may be enhanced by smoothing a point cloud to produce a surface exhibiting a reduction in the appearance of, for example, errors, discontinuities and/or data sparseness. This enhanced surface, typically formed of a plurality of triangles, may then be colorized using data indicative of the actual color reflectance properties of each triangle as they appear in the environment as detected by a camera or other imaging device. In some embodiments, the image data can be mapped to and overlaid on the triangle mesh directly to provide color resolution beyond the triangle size, such that each triangle represents a rectified part of an image as opposed to a single color or interpolated color from color values at the triangle vertices. In some embodiments, both the point cloud and the imagery may be acquired from instruments that are also inputs to the SLAM solution.

In this embodiment, the three forms of data that may be acquired by the SLAM system include, but are not limited to, (1) point cloud data, including the intensity of reflectance from LIDAR points in the point cloud, (2) SLAM trajectory and orientation data and (3) images. As noted above, the point cloud data 1002 may be acquired by a LIDAR component of the SLAM. Trajectory data 1004 may be acquired via a full SLAM solution including, but not limited to, an IMU (accelerometers), visual odometry, laser odometry and mapping. Images 1006 may be acquired from one or more cameras which may be part of the SLAM solution or auxiliary sensors for the sole purpose of image capture for color texturing.

Figure 3:
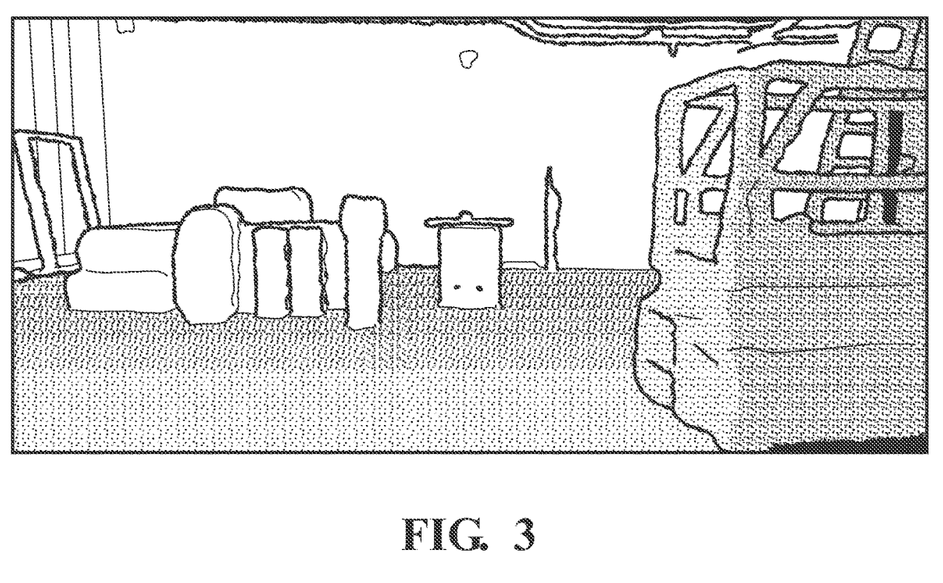
FIG. 3 illustrates an exemplary and non-limiting embodiment of point cloud data.

The point cloud data 1002 and the trajectory data 1004 may form inputs to a cleaning and down sampling module 1008. With reference to FIG. 3, there is illustrated an exemplary and non-limiting point cloud composed of LIDAR data. While described as independent modules performing discreet and defined functionality, each module may be performed by software executing on a general purpose processor such as may form a part of a SLAM system.

Figure 4:
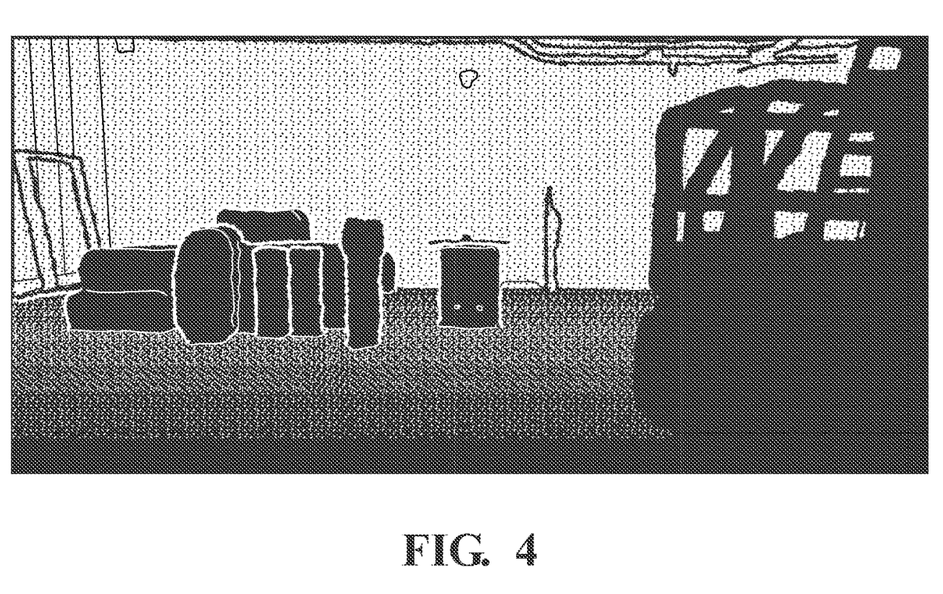
FIG. 4 illustrates an exemplary and non-limiting embodiment of cleaned and down sampled point cloud data.

With continued reference to FIG. 1, in general, the step of cleaning the point cloud data 1002 comprises removing data from areas and/or volumes that are sparse in terms of data density. Such sparse data may arise when, for example, a transient object such as a person walks through a scan. A similar occurrence of sparse data may arise from stray laser data, sunspray, reflections, and the like. It is further useful to reduce the noise properties of observed surfaces (i.e. using higher-confidence point data observed from a close distance), trim only partially observed areas (by density or distance from observer for example), and reduce the point-based complexity of relatively smooth surfaces (i.e. flat surfaces comprised of many millions more points in the point cloud than are required to accurately represent the surface in 3D meshes). In addition to removing such data, the point cloud data 1002 may be down sampled so that, for example, the entire point cloud exhibits a relatively constant data density. With reference to FIG. 4, there is illustrated an exemplary and non-limiting embodiment of the cleaned and downsampled point cloud data of FIG. 3.

With continued reference to FIG. 1, after cleaning the data, processing proceeds to the normal calculation module 1010. The normal calculation module 1010 calculates and assigns a normal vector to each point by performing plane fitting on neighboring points to determine a local normal vector, the orientation of this vector (into or out of the plane) is then determined based upon the dot product between this vector and the vector from the point in question to the position it was captured, which is contained in the trajectory data 1004. For example, if one has a plurality of points arranged in a generally planar fashion and representing a surface of a wall, it is not apparent which side of the planar surface represents the outside of the wall and which side the inside. Using knowledge of the position of the SLAM system at the time of point cloud data 1002 acquisition, one may assign normal data vector to each point so that one may differentiate between the two sides of such a wall. Information from the local geometric neighborhood (for example, normal orientation, curvature, etc) and from the location and orientation of observation (sharp angles from the lidar to planar surfaces are usually inaccurate) can also be useful to disambiguate point or surface normals.

In accordance with some exemplary embodiments, cleaning and sharpening of the mesh may occur after down-sampling and computing the normals. Advantages of such an order of operation derive from the observation that downsampling first reduces processing time significantly by removing points that are close enough to be considered duplicate data. Alternate embodiments of downsampling may instead average values (x, y, z, intensity, etc,) assigned to all points within a minimum size box, or voxel, to generate an average points at a fixed maximum density. Further, point normals help one to segment the data more intelligently during the cleaning steps. For example, one may more easily identify and remove the floor before removing sparse objects that might be on or near the floor. With regards to sharpening, one may adjust point locations for planar and edge points by looking at nearby points and adjusting all of them toward the mean location of the plane or edge. Having normals in this step allows one to do this separately for the two sides of a wall by having a normal difference threshold in the planar sharpening. Also, one may use the segmentation information in the cleaning step to sharpen distinct objects separately, which can reduce false matches and dramatically speed up nearest neighbor searches by intelligently subdividing the processing.

Having assigned the normal vectors to each point in the point cloud 1002, processing proceeds to the mesh module 1012. Various known methods may be applied to a point cloud to produce one or more surfaces and/or volumes bounded by a continuous network of triangles. In some instances, a predetermined smoothing coefficient may be applied. For example, a triangle may be defined as being proper if the deviation from the surface of the triangle in three dimensional space of other sub-point cloud points is below a predetermined threshold. Such an algorithm results in larger and fewer triangles forming smoother planar surfaces which preserve the detail of the underlying point cloud within a predetermined threshold. Reducing triangles can favor fewer triangles on planar segments of the model and more triangles near edges and on complex geometry. It is also the case that such an algorithm identifies and preserves generally planar surfaces. As a result, flat floors, walls and signs, for example, result in mesh surfaces that are flat and from which has been removed data noise in the form of random fluctuations from a flat plane. Having fewer triangles in planar regions reduces model size, simplifies the optimization process for image overlay, and results in a higher accuracy visual appearance of a colored model.

Image location and orientation module 1014 may operate in parallel with the operation of modules 1008, 1010 and 1012 to locate and properly orient each of the acquired images. Orientation module 1014 receives as input trajectory data 1004 and image data 1006. Based on the trajectory data 1004 and the time that each of the images was taken, one may compute where in an environment an image was taken from and what direction the camera was facing at the time that the image was acquired. The resulting data allows one to project each point in an image back and away from the camera into space.

These facts, along with having a solid surface mesh model, further allow one to more precisely perform "ray tracing". In this process one projects a ray from the camera out into space and measures the location of the first collision with an object. This allows one to accurately apply depth to image points, and also measure occlusions in the environment. One may also ascertain view-dependent geometric properties (i.e. depth-gradients, normal-gradients, etc). Furthermore, one may also conversely project information from the 3D model back into the camera frame. This ability aids in the performance of iterative processing.

Having thusly derived the orientation of each image in space and with respect to the position of the camera taking each image, one may project each image backwards in space if one knows the distance to each surface onto which the image is to be projected. Blend and overlay texture module 1016 receives as input the smooth mesh from mesh module 1012 and the image location and orientation information from module 1014. Using these inputs, module 1016 stitches the plurality of images together and projects or overlays the images onto the mesh. This process is similar to the methodology employed on various phone apps to stitch a panorama image together from a plurality of sub-images with the difference that the present methodology is performed on sub-regions of images that are collectively mapped into three dimensional space.

In some exemplary embodiments, this "stitching" process operates in both image space and 3D space both separately and combined in multiple stages.

Figure 2A:
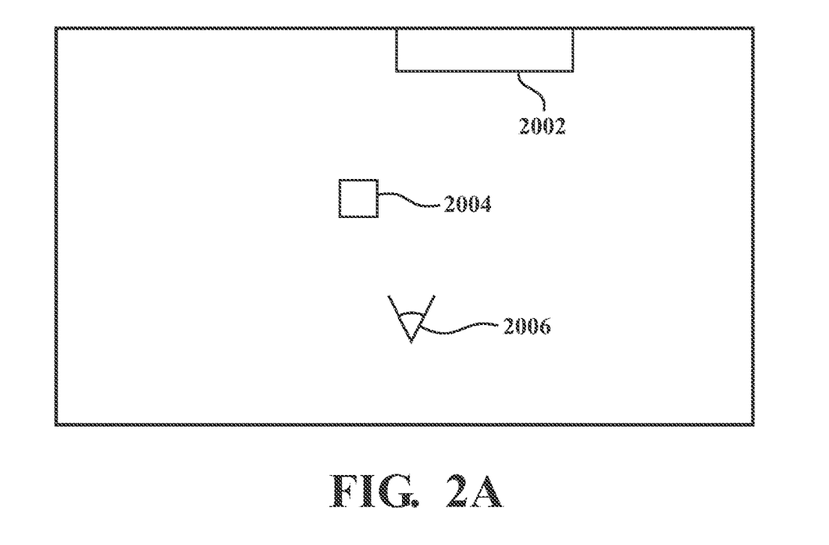
FIGS. 2(a)-2(c) illustrate an exemplary and non-limiting embodiment of a method of stitching imagery together utilizing 3D mesh data.
Figure 2B:
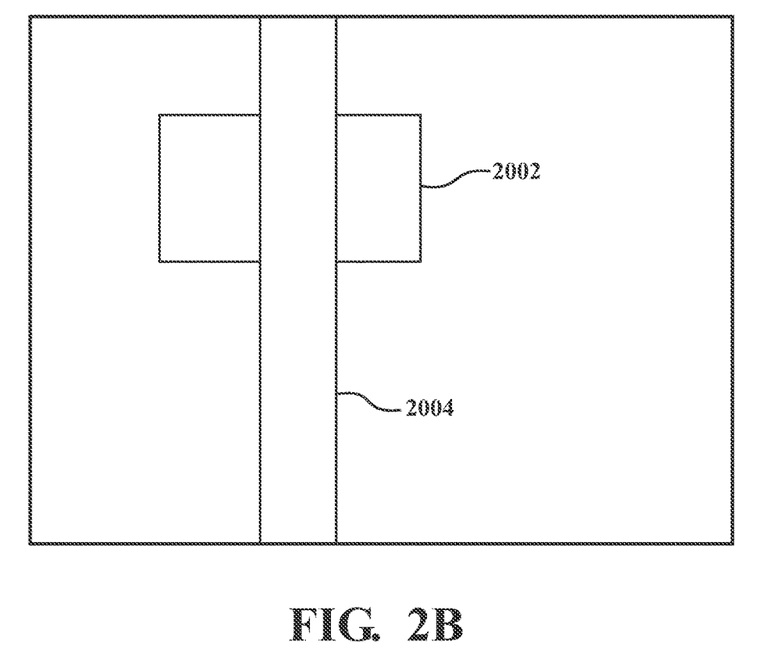
Figure 2C:
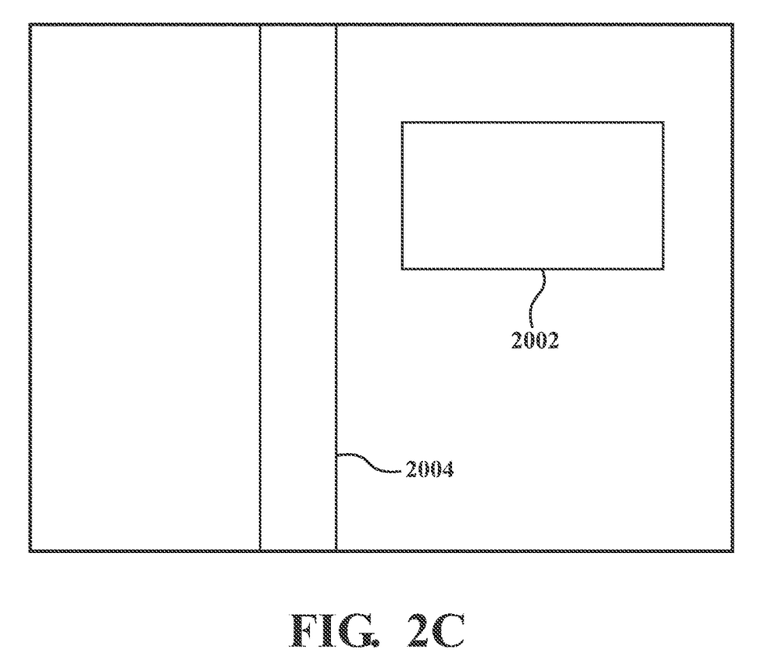

With reference to FIGS. 2(*a*)-(*c*), there is illustrated an exemplary and non-limiting embodiment of image stitching performed utilizing a corresponding 3D mesh. FIG. 2(*a*) is a plan view of an operator of a SLAM 2006 in a room with a pillar 2004 and a television 2002 on an opposing wall. FIG. 2(*b*) illustrates an elevation view where the image captured by the SLAM in which the television 2002 is partially occluded by the pillar 2004. FIG. 2(*c*) illustrates an elevation view where the image captured by the SLAM in which the television 2002 is not occluded by the pillar 2004.

In the present example, the two images may be used to stitch together an image of the television 2002. Using a standard methodology, a problem arises when the occluding pixels formed of the pillar are used when attempting to stitch together the television from the two images. In the present instance, it is possible to determine that the pillar pixels which occlude the television form a part of a pillar that is in front of the plane of the television. This may determined with reference to the mesh. As a result, the occluding pixels forming a part of the pillar 2004 in FIG. 2(*b*) may be disregarded when stitching the images of the television together. By intelligently cropping and splicing sections from multiple images, accurate color information can be mapped to many surfaces even when observed in a plurality of images regardless of partial occlusions.

Returning to FIG. 1, in some embodiments, the overlaying of image information onto the mesh utilizes knowledge of the geometric structure of the mesh. For example consider the mapping of an image which comprises entirely a globe of the earth. In this example, there is likewise a three dimensional mesh representation of the globe onto which the image of the globe is to be projected/overlayed. As one approaches the edges of the globe as they appear in the image, the pixels of the image are stretched in 3D space over a relatively large triangular surface owing to the near ninety (90) degree difference between the direction of view reflected in the image and the normal vector pointing away from the surface of the globe. Very small errors in such situations can cause all or part of such pixels to be projected onto whatever is behind the globe. However, it is often the case that abrupt changes in the depth of various objects as one scans from side to side, for example, are reflected in abrupt changes in the visual aspects of an image associated with the objects. In the present example, one may deduce that the rounded edge of the spherical globe as it appears in an image is an incongruity associated with the curvature of the globe in three dimensional space. As a result, one may take care to not project any pixels associated with the sphere onto any other surface and one may also use these associated edges to refine the alignment of the image and three dimensional data beyond initial estimates, such as from a SLAM system.

In some instances, one may use surface normal information to determine which of a plurality of images or which portion of one or more images should be projected/overlayed onto a mesh surface. For example, if more than one image covers the same triangle of a mesh, one may choose the image or image portion that was captured from a direction most closely parallel to a surface normal of the triangle. In accordance with such a methodology, as one overlays images onto a globe, there will not exist the instance wherein one is applying image pixels to an edge of a sphere having a normal nearly perpendicular to the image capture direction of the camera.

In some embodiments, relative normal directions are only one piece of weighting utilized in various optimization steps. One may also use pixel-based-resolution (also called area) to determine image selections. For example, images where a surface triangle is larger means there is more detail, and the image was taken closer to the object (if the camera has a fixed resolution). One may further utilize additional information including, but not limited to, the sharpness/focus of triangles in the image (sometimes measured by image gradients or sum of pixel gradients over the pixel area) and the blurriness of the image derived from metrics like speed/acceleration during the moment of image capture along with lighting conditions and settings for the camera (exposure time, gains, etc).

By incorporating normal information from the mesh with camera capture direction information, it is further possible to minimize glare and other lighting effects which arise from the sun or lighting angles. In some embodiments, image color data may be represented in a color coordinate system comprised of orthogonal vectors representing hue, saturation and intensity. In some instances where it is known from the mesh model that a surface is continuous and relatively smooth, the intensity vector of an overlayed image may be dropped while maintaining the hue and saturation values of the pixels so as to eliminate shadows in the image before it is overlayed.

Finally, the output of module 1016 comprising a colorized mesh may form the input to interpolate module 1018. Interpolate module 1018 may operate to identify points on the colorized mesh which correspond to the position of one or more points in the point cloud. Once identified, each point in the point cloud may be attributed with the color of the corresponding position in the colorized mesh. In this way, points in the point cloud may be accurately attributed with the color of the object associated with each point.

Figure 5:
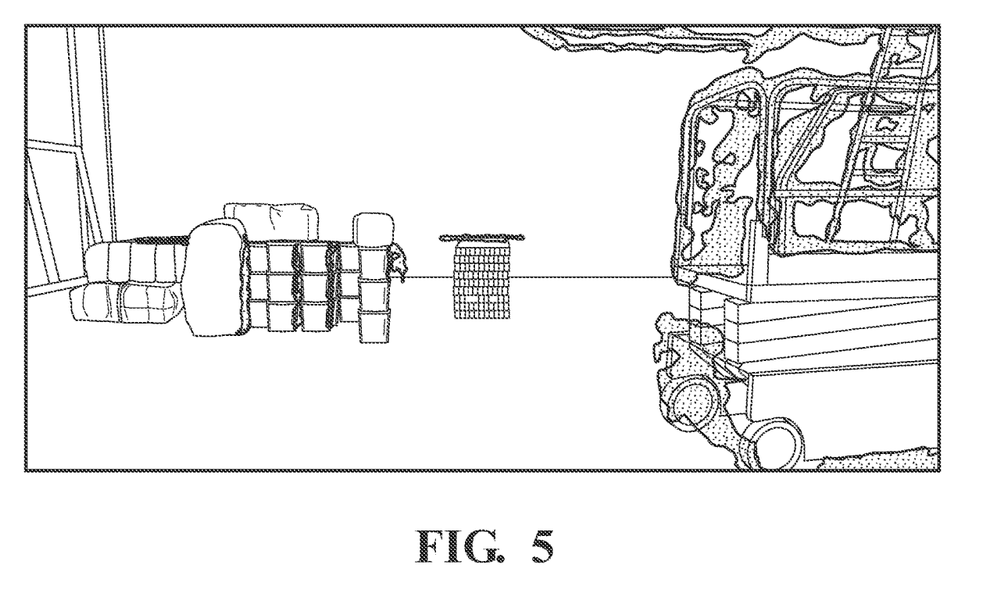
FIG. 5 illustrates an exemplary and non-limiting embodiment of a colorized mesh.
Figure 6:
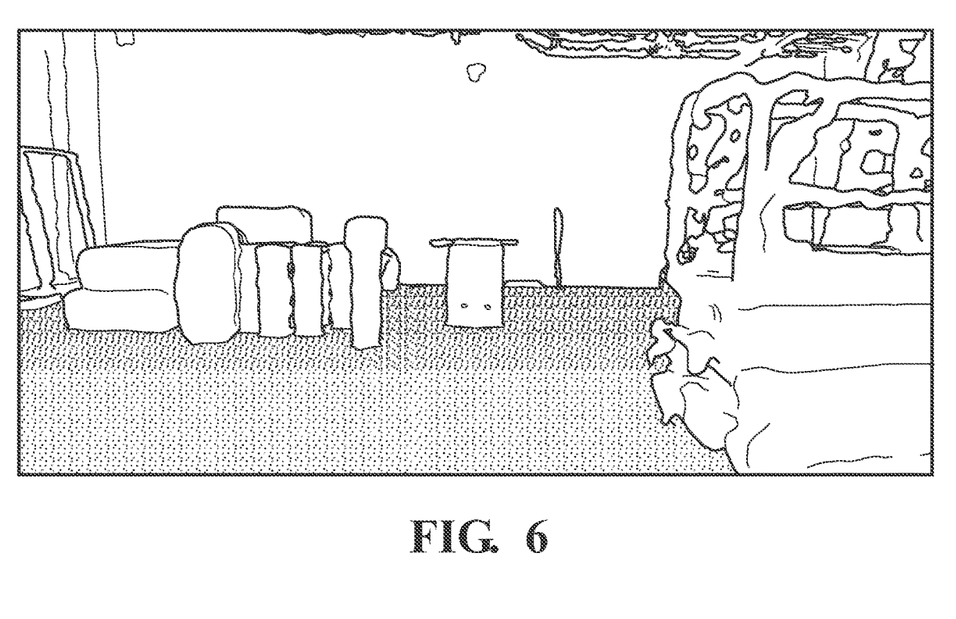
FIG. 6 illustrates an exemplary and non-limiting embodiment of a mesh.

With reference to FIG. 6, there is illustrated an exemplary and non-limiting embodiment of a mesh created from the point cloud of FIG. 3 while FIG. 5 illustrates an exemplary and non-limiting embodiment of the same mesh after colorization as described herein. While FIG. 5 illustrates a colorized mesh comprised of a plurality of triangles attributed with color information from one or more images and therefore appears in color, it is understood that the colors of the mesh are presented in grey scale in accordance with the dictates of the medium in which they are illustrated.

In some instances, there may be no images corresponding to a portion of the mesh resulting in a plurality of triangles lacking any color attribution. In such instances, one may assign triangles a color based on the color attributes of nearby colored triangles. In other instances, the geometry of a mesh surface may contribute to the manner in which unattributed triangles are colored. For example, if it is determined that a generally flat expanse, like a top side of a sofa cushion, is generally colored orange around a periphery of the cushion surface while the interior is missing color information from any image, the interior of the mesh portion corresponding to the interior portion of the cushion surface may likewise be colorized in a manner consistent with the periphery. Variations in the laser return intensity in the three dimensional data may also be used to more accurately interpolate and extrapolate color information from colored to uncolored, by assuming that bordering regions with similar IR reflectivity, and therefore similar laser return intensity, are similar in color. Therefore, neighboring colored triangles with similar intensity values may be prioritized in interpolation.

The creation of the mesh may proceed in an automated fashion in real-time or near real-time with respect to the operation of a SLAM. Likewise, the blending and overlay of image data onto the mesh may be performed in real-time or near real-time. In other instances, post processing may be performed by a user via a user interface. For example, a user may identify a portion of the mesh which is known to be flat, such as a sign or a floor. In response to the user identification, the mesh may be updated such that the identified portion is represented by a flat expanse of triangles. Similarly, a user may identify via a user interface a portion of the mesh and a corresponding color. In response, the mesh may be updated to apply the color to the triangles forming the identified portion of the mesh. Automated or user assisted solutions could leverage point cloud plane detection algorithms, such as RANSAC approaches to identify candidate planar regions.

The image overlay is an optimization process that first calculates all potential image segments to overlay on one triangle. The optimization then minimizes things like the angle between the triangle normal and the image direction and the number of image swaps for nearby neighbors (to try and use the same images in neighboring parts of the mesh). In addition, if formed in real time, the mesh itself may update with new data to adjust the average position of planar elements and add detail to complex geometry.

In some instances, additional data gathered by the SLAM and forming a part of the point cloud data may be used to better align imagery with the mesh. In some instances, LIDAR instruments record intensity data for each point indicative of IR reflectivity. In one non-limiting example, a wall covered by a black and white checkerboard visual pattern is scanned and imaged by a SLAM. The captured images will show the checkerboard pattern. Likewise, the IR intensity data will provide nicely bifurcated intensity values indicating if individual points in the point cloud forming the wall are light are dark. As a result, the underlying IR intensity values of the point cloud may be used to align the images to the mesh formed from the point cloud points. In addition when certain areas or spaces are identified as gaps in the surfaces and volumes, the system can make recommendations having identified the open areas with no data. This is accomplished by noting voids in the data and highlighting and making the user or system aware of this.

The use of Simultaneous Localization and Mapping (SLAM) devices in the production of point clouds is described, for example, in PCT/US18/42346 (Publication No. WO 2019/018315), entitled "ALIGNING MEASURED SIGNAL DATA WITH SLAM LOCALIZATION DATA AND USES THEREOF," filed on Jul. 16, 2018, which is incorporated herein by reference in its entirety and for all purposes.

While only a few embodiments of the present disclosure have been shown and described, it will be obvious to those skilled in the art that many changes and modifications may be made thereunto without departing from the spirit and scope of the present disclosure as described in the following claims. All patent applications and patents, both foreign and domestic, and all other publications referenced herein are incorporated herein in their entireties to the full extent permitted by law.

The methods and systems described herein may be deployed in part or in whole through a machine that executes computer software, program codes, and/or instructions on a processor. The present disclosure may be implemented as a method on the machine, as a system or apparatus as part of or in relation to the machine, or as a computer program product embodied in a computer readable medium executing on one or more of the machines. In embodiments, the processor may be part of a server, cloud server, client, network infrastructure, mobile computing platform, stationary computing platform, or other computing platform. A processor may be any kind of computational or processing device capable of executing program instructions, codes, binary instructions and the like. The processor may be or may include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor, or any machine utilizing one, may include non-transitory memory that stores methods, codes, instructions and programs as described herein and elsewhere. The processor may access a non-transitory storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server, cloud server, and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers, social networks, and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements. The methods and systems described herein may be adapted for use with any kind of private, community, or hybrid cloud computing network or cloud computing environment, including those which involve features of software as a service (SaaS), platform as a service (PaaS), and/or infrastructure as a service (IaaS).

The methods, program codes, and instructions described herein and elsewhere may be implemented on a cellular network has sender-controlled contact media content item multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, program codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media has sender-controlled contact media content item a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices has sender-controlled contact media content item artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps associated therewith, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, methods described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the disclosure has been disclosed in connection with the preferred embodiments shown and described in detail, various modifications and improvements thereon will become readily apparent to those skilled in the art. Accordingly, the spirit and scope of the present disclosure is not to be limited by the foregoing examples, but is to be understood in the broadest sense allowable by law.

The use of the terms "a" and "an" and "the" and similar referents in the context of describing the disclosure (especially in the context of the following claims) is to be construed to cover both the singular and the plural, unless otherwise indicated herein or clearly contradicted by context. The terms "comprising," "has sender-controlled contact media content item," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

While the foregoing written description enables one of ordinary skill to make and use what is considered presently to be the best mode thereof, those of ordinary skill will understand and appreciate the existence of variations, combinations, and equivalents of the specific embodiment, method, and examples herein. The disclosure should therefore not be limited by the above described embodiment, method, and examples, but by all embodiments and methods within the scope and spirit of the disclosure.

All documents referenced herein are hereby incorporated by reference.

What is claimed is:

1. A system comprising:
   a camera unit;
   a laser scanning unit; and
   a computing system in communication with the camera unit and the laser scanning unit, wherein the computing system comprises at least one processor adapted to execute instructions that when executed cause the system to:
   determine a mesh representing an environment based, at least in part, on a point cloud, the mesh comprising a plurality of triangles each having a normal vector;
   acquire one or more images of the environment wherein each of the one or more images is attributed with a view position and a view angle; and
   apply the one or more images to the mesh by applying the one or more images to the mesh based, at least in part, upon a comparison of the view angle with the normal vector.

2. The system of claim 1, wherein the at least one processor is further adapted to execute instructions that when executed cause the system to, stitch at least two of the one or more images together.

3. The system of claim 2, wherein the at least one processor is further adapted to execute instructions that when executed cause the system to stitch at least two of the one or more images together by utilizing the mesh to identify at least one portion of the mesh that is occluded and disregarding portions of at least one image corresponding to the at least one occluded portion.

4. The system of claim 1, further comprising applying the one or more images to the mesh by ray tracing at least one of the one or more images onto the mesh.

5. The system of claim 4, wherein the ray tracing comprises refraining from ray tracing the at least one of the one or more images onto a triangle of the mesh when a surface normal of the triangle is not substantially parallel to the view angle.

6. The system of claim 4, wherein the ray tracing comprises utilizing a pixel-based resolution of at least one of the one or more images.

7. The system of claim 6, wherein utilizing the pixel-based resolution of at least one of the one or more images comprises weighting an individual image with respect to another individual image when ray tracing based, at least in part, on a number of pixels forming each image that correspond to a single triangle of the mesh.

8. The system of claim 4, wherein the ray tracing comprises weighting an individual image with respect to another individual image is based, at least in part, on a sharpness of at least a portion of pixels forming each image that corresponds to a single triangle of the mesh.

9. The system of claim 4, wherein the ray tracing comprises weighting an individual image with respect to another individual image is based, at least in part, on a motion of an instrument acquiring each image at a moment that the individual image was acquired.

10. A system comprising:
a camera unit;
a laser scanning unit; and
a computing system in communication with the camera unit and the laser scanning unit, wherein the computing system comprises at least one processor adapted to execute instructions that when executed cause the system to:
determine a mesh representing an environment based, at least in part, on a point cloud, the mesh comprising a plurality of triangles each having a normal vector;
acquire one or more images of the environment wherein each of the one or more images is attributed with a view position and a view angle; and
apply the one or more images to the mesh
by ray tracing at least one of the one or more images onto the mesh.

11. The system of claim 10 wherein the at least one processor is further adapted to execute instructions that when executed cause the system to, stitch at least two of the one or more images together.

12. The system of claim 11, wherein the at least one processor is further adapted to execute instructions that when executed cause the system to stitch at least two of the one or more images together by utilizing the mesh to identify at least one portion of the mesh that is occluded and disregarding portions of at least one image corresponding to the at least one occluded portion.

13. The system of claim 10, wherein the ray tracing comprises refraining from ray tracing the at least one of the one or more images onto a triangle of the mesh when a surface normal of the triangle is not substantially parallel to the view angle.

14. The system of claim 10, wherein the ray tracing comprises utilizing a pixel-based resolution of at least one of the one or more images.

15. The system of claim 14, wherein utilizing pixel-based resolution of at least one of the one or more images comprises weighting an individual image with respect to another individual image when ray tracing based, at least in part, on a number of pixels forming each image that correspond to a single triangle of the mesh.

16. The system of claim 10, wherein the ray tracing comprises weighting an individual image with respect to another individual image is based, at least in part, on a sharpness of at least a portion of pixels forming each image that corresponds to a single triangle of the mesh.

17. The system of claim 10, wherein the ray tracing comprises weighting an individual image with respect to another individual image is based, at least in part, on a motion of an instrument acquiring each image at a moment that the individual image was acquired.

18. A system comprising:
a camera unit;
a laser scanning unit; and
a computing system in communication with the camera unit and the laser scanning unit, wherein the computing system comprises at least one processor adapted to execute instructions that when executed cause the system to:
determine a mesh representing an environment based, at least in part, on a point cloud, the mesh comprising a plurality of triangles each having a normal vector;
acquire one or more images of the environment wherein each of the one or more images is attributed with a view position and a view angle; and
apply the one or more images to the mesh by maintaining a hue and saturation of a plurality of pixels forming each image while disregarding an intensity value of each of the plurality of pixels.

19. A system comprising:
a camera unit;
a laser scanning unit; and
a computing system in communication with the camera unit and the laser scanning unit, wherein the computing system comprises at least one processor adapted to execute instructions that when executed cause the system to:
determine a mesh representing an environment based, at least in part, on a point cloud, the mesh comprising a plurality of triangles each having a normal vector;
acquire one or more images of the environment wherein each of the one or more images is attributed with a view position and a view angle;
apply the one or more images to the mesh; and
identify at least one portion of at least one triangle corresponding to at least one point in the point cloud and attributing the at least one point with an attribute of the one or more images applied to the at least one triangle of the mesh.

20. The system of claim 19, wherein the at least one point is attributed with a color of the one or more images.

21. The system of claim 20, wherein the color is derived from a pixel of the one or more images.

22. The system of claim 21, wherein the color is derived from an average of a plurality of pixels of the one or more images.

23. The system of claim 20, wherein the at least one point is attributed based, at least in part, on a laser return intensity.

24. The system of claim 23, wherein the laser return intensity is derived from the laser scanning unit.

25. A system comprising:
   a camera unit;
   a laser scanning unit; and
   a computing system in communication with the camera unit and the laser scanning unit, wherein the computing system comprises at least one processor adapted to execute instructions that when executed cause the system to:
   determine a mesh representing an environment based, at least in part, on a point cloud, the mesh comprising a plurality of triangles each having a normal vector;
   acquire one or more images of the environment wherein each of the one or more images is attributed with a view position and a view angle; and
   apply the one or more images to the mesh by assigning a color to at least one of the plurality of triangles based, at least in part, upon a color of another triangle.

26. The system of claim 25, wherein the at least one of the plurality of triangles and the another triangle are adjacent to one another.

27. The system of claim 25, wherein the at least one of the plurality of triangles and the other another triangle are near to one another.

* * * * *

UNITED STATES PATENT AND TRADEMARK OFFICE
CERTIFICATE OF CORRECTION

PATENT NO. : 11,398,075 B2
APPLICATION NO. : 16/929154
DATED : July 26, 2022
INVENTOR(S) : Zhang et al.

It is certified that error appears in the above-identified patent and that said Letters Patent is hereby corrected as shown below:

On the Title Page

On the page 3, item (56), in Column 2, under "Other Publications", Line 66, delete "bulling" and insert -- building --.

In the Claims

In Column 14, Line 11, in Claim 15, delete "utilizing" and insert -- utilizing the --.

In Column 15, Line 31, in Claim 27, delete "other another" and insert -- another --.

Signed and Sealed this
Twentieth Day of September, 2022

Katherine Kelly Vidal
*Director of the United States Patent and Trademark Office*